United States Patent [19]
Boskovic

[11] Patent Number: 5,814,357
[45] Date of Patent: Sep. 29, 1998

[54] CORE LIFTER SYSTEM FOR USE IN A PLASTIC INJECTION MOLD

[76] Inventor: Borislav Boskovic, 2102 Bannockburn, Inverness, Ill. 60067

[21] Appl. No.: 912,083

[22] Filed: Aug. 15, 1997

[51] Int. Cl.⁶ ................................................. B29C 45/44
[52] U.S. Cl. ...................... 425/556; 264/318; 264/334; 425/577; 425/DIG. 58
[58] Field of Search ................................ 425/556, 577, 425/444, DIG. 58, 436 RW, 436 R, DIG. 10, 441; 249/68, 67; 264/334

[56] References Cited

U.S. PATENT DOCUMENTS

| | | | |
|---|---|---|---|
| 3,642,417 | 2/1972 | Von Holdt | 425/DIG. 58 |
| 4,854,849 | 8/1989 | Sudo | 425/556 |
| 5,137,442 | 8/1992 | Starkey | 425/577 |
| 5,281,127 | 1/1994 | Ramsey | 425/556 |
| 5,316,467 | 5/1994 | Starkey | 425/577 |
| 5,551,864 | 9/1996 | Boskovic | 425/556 |

*Primary Examiner*—Tim Heitbrink
*Attorney, Agent, or Firm*—Lee, Mann, Smith, McWilliams, Sweeney & Ohlson

[57] ABSTRACT

A core lifter system for a plastic injection mold, where one or more core blades is used to not only provide an undercut in the formed molded part, but also aid in ejecting the molded part from the mold. A blade retainer for the core blade is located in a support, with the support having a semi-circular socket shaped to engage a coupling end of the blade retainer. The blade retainer is immobily secured in the socket at a desired angle of inclination relative to the support.

19 Claims, 4 Drawing Sheets

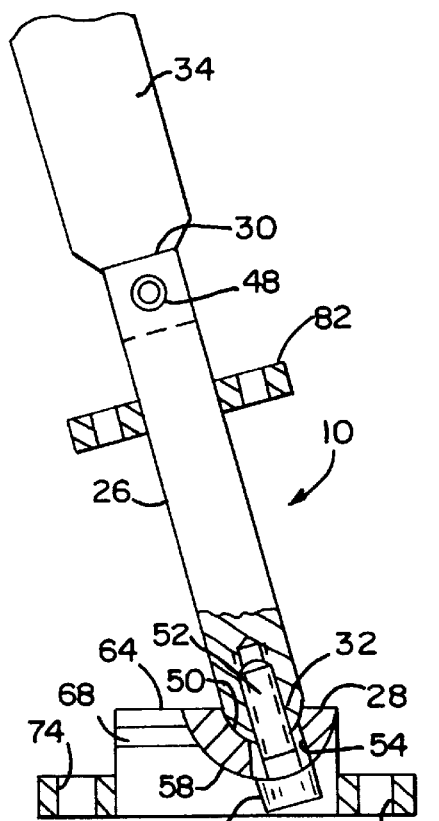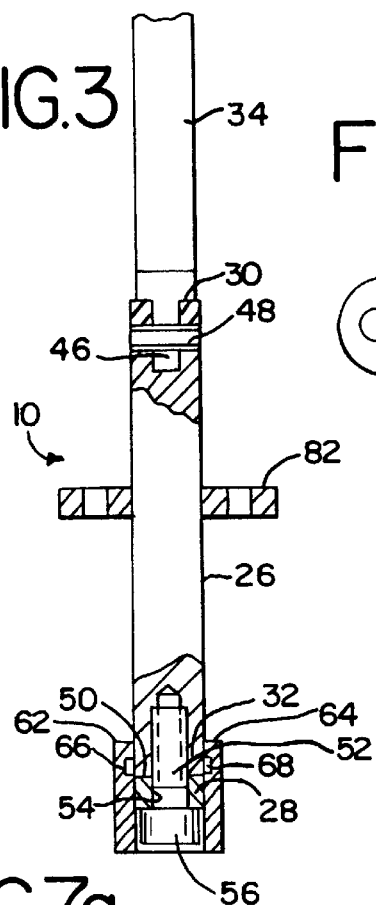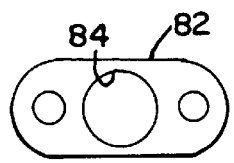

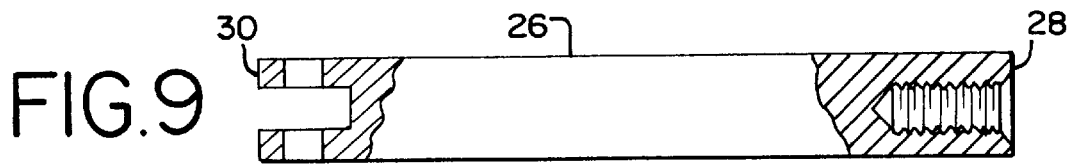
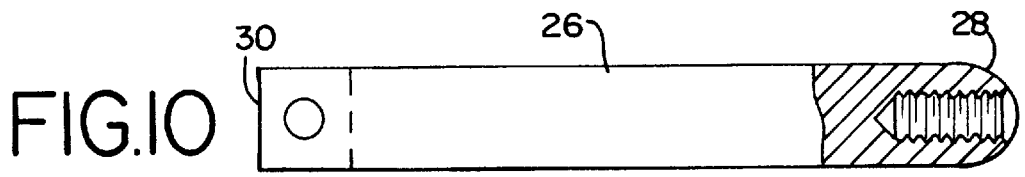
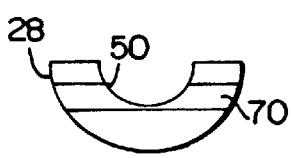
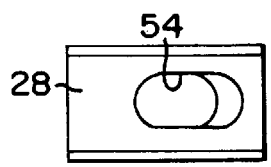
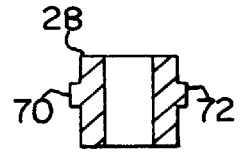
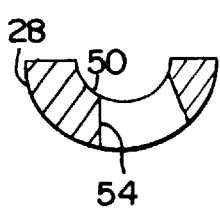
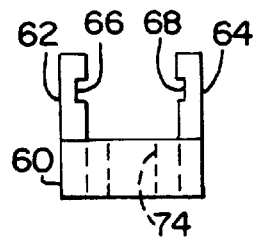
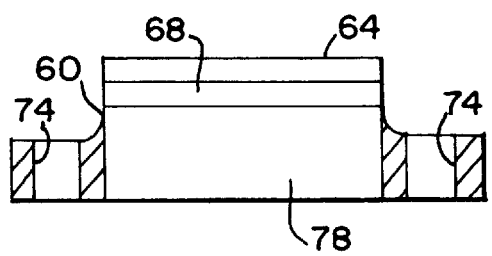
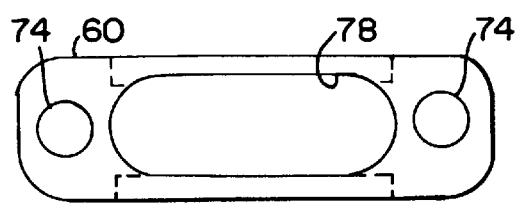
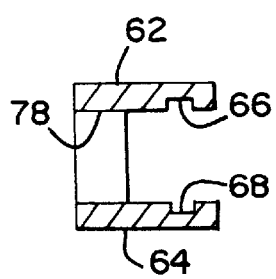

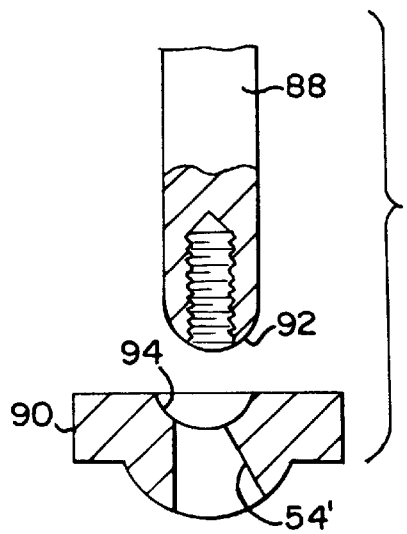
FIG. 19
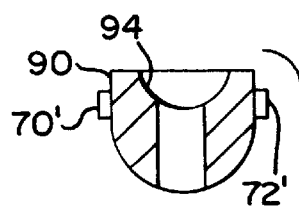
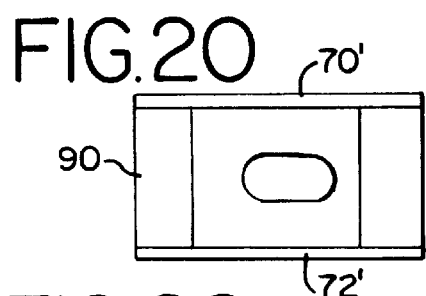
FIG. 20
FIG. 21
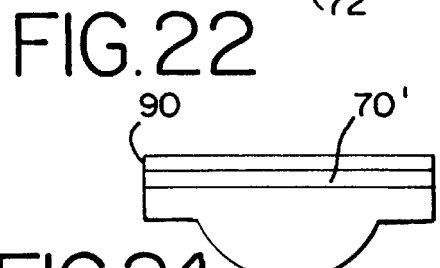
FIG. 22
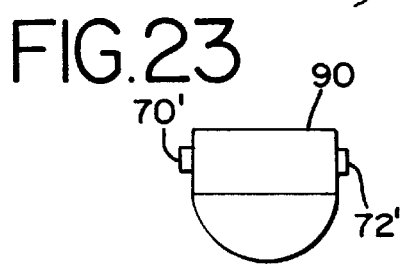
FIG. 23
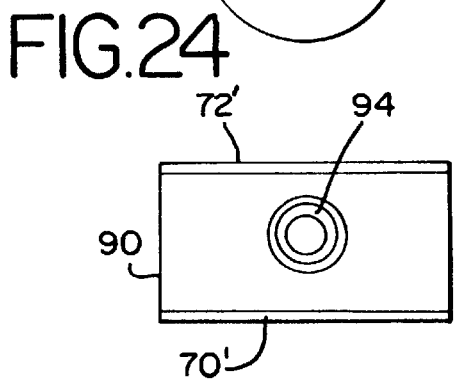
FIG. 24

CORE LIFTER SYSTEM FOR USE IN A PLASTIC INJECTION MOLD

BACKGROUND OF THE INVENTION

This invention relates to plastic injecting molding, and in particular to a core lifter system for use in a plastic injection mold where a part is to be formed having an undercut.

Core lifters are used in plastic injection molds to aid in forming a plastic part which has an undercut which could not normally be formed without employing a mold element that can move out of engagement when the mold is being opened. Core lifters are provided in various sizes and shapes, and are inclined at an angle to the opening direction of the mold so that when the mold is parted, the lifter can be moved out of engagement with the plastic part to permit and aid the part in being ejected from the mold.

U.S. Pat. No. 5,132,442 provides an improved core lifter in which the core blade is pivotally mounted relative to its support so that the blade can be oriented at any of a number of desired angles. Thus, unlike core lifters prior to the '442 patent, a single core lifter is used, no matter what the desired angle of inclination might be. However, the blade must be changed each time a different undercut is desired, and in order to change the blade, the mold must be disassembled for access to the gib in which the core lifter is mounted. A further version of this device is found in U.S. Pat. No. 5,316,467.

U.S. Pat. No. 5,551,864, disclosing a core lifter system invented by the inventor of the present application, and the disclosure of which is incorporated herein by reference, is a further improvement in a core lifter system. In one form it has a core blade which may be locked at a desired angle of inclination, and in another form, a series of different blade supports are provided with a universal core blade for providing the required angle of inclination.

While the lifters of the prior art fulfill the basic need for molding with an undercut and also aiding in ejection of the molded part, their structures are relatively complex. In addition, whenever it is desired to replace a lifter, the mold must be disassembled down to the ejector plate in order to access the mounting means for the core lifter. This results in not only significant downtime for the mold, but also additional cost for the labor to replace the core lifter and also due to the downtime itself. Those costs must be passed along by increasing the cost of the parts being molded by the plastic injection mold.

SUMMARY OF THE INVENTION

The invention is directed to an improved core lifter system for a plastic injection mold. The invention includes a blade retainer having a blade-mounting end and an opposite coupling end. A support for the blade retainer is provided, with the support having a socket shaped to engage the coupling end. The coupling end is likewise shaped to conform to the socket. Means is provided for permitting linear translation of the support on an ejector plate. Means is also provided for immobily securing the blade retainer in the socket with the blade retainer fixed at a desired angle of inclination relative to the support.

In accordance with the preferred form of the invention, the blade support is mounted in a gib, and the means for permitting linear translation comprises a guide in the gib which engages a guide in the support. The gib includes a central channel in which the support is mounted, and in accordance with the disclosed form of the invention, the guide in the gib comprises opposite groves in the gib, and the guide in the support comprises opposite rails in the support, with the rails engaged in the groves.

Means is provided in the gib for permitting access to the means for immobily securing the blade retainer in the socket. That access means comprises an aperture in the bottom of the gib. Access to the gib and therefore to the core lifter system can be through the bottom of the mold without disassembly of the mold.

The means for securing the blade retainer in the socket comprises a screw which extends through a hole in the support and which is threadedly engaged in the coupling end of the blade retainer. The hole is radially elongated in a longitudinal dimension of the support. The screw includes an expanded head, and the support includes a curvilinear surface against which the head bears so that the blade retainer can be immobily fixed at a desired angle of inclination relative to the support.

In the preferred form of the invention, the socket in the support is semi-circular in cross section. The coupling end of the blade retainer is similarly shaped for being seated within the socket.

In use, a removable ejector blade is engaged in the blade-mounting end of the blade retainer. A guide element is mounted about the blade retainer for guiding of the blade retainer in the mold as the mold is opened and closed. The guide element comprises a plate having a central aperture which is shaped to accommodate passage of the blade retainer.

BRIEF DESCRIPTION OF THE DRAWINGS

The invention is described in greater detail in the following description of an example embodying the best mode of the invention, taken in conjunction with the drawing figures, in which:

FIG. 2 is a slightly reduced side elevational view of the core lifter system according to the invention, partially in cross section, with all portions of the mold being omitted, FIG. 3 is a side elevational view of the core lifter system shown in FIG. 2, again with portions shown in cross section, FIG. 4 is a top plan view of the guide element used for guiding the blade retainer illustrated in FIGS. 1 through 3, FIGS. 5a and 5b show, respectively, the cross section of one core lifter blade and a partial elevational view of the core lifter blade installed in a blade retainer, with portions in cross section to illustrate detail, FIGS. 6a and 6b are similar to FIGS. 5a and 5b, but with a core blade of different cross section, FIGS. 7a and 7b are also similar to FIGS. 5a and 5b, but with a core blade of different cross section, FIGS. 8a and 8b are also similar to FIGS. 5a and 5b, with a core blade of yet a further cross section, FIG. 9 is an elevational illustration of the blade retainer according to the invention, with portions in cross section to illustrate detail, FIG. 10 is a view similar to FIG. 9, but with the blade retainer rotated 90 degrees in relation to FIG. 9, FIG. 11 is a side elevational illustration of the support for the blade retainer according to the invention, FIG. 12 is a top plan view thereof, FIG. 13 is a cross sectional view taken laterally across the support shown in FIG. 11, FIG. 14 is a cross sectional view taken longitudinally along the support of FIG. 11, FIG. 15 is a cross sectional illustration of a gib according to the invention, FIG. 16 is a bottom plan view thereof, FIG. 17 is an end view thereof, taken from either end of the gib of FIG. 15, FIG. 18 is a cross sectional illustration taken midway through the gib illustrated in FIGS. 15 and 16, FIG. 19 is a partially cut away elevational view of a revised version of the invention, showing the blade retainer and the blade support, FIG. 20 is a bottom plan view of the support of FIG. 19, FIG. 21 is a partial cross sectional view of the blade support of FIG. 19, showing the attachment screw in position, FIG. 22 is a side elevational view of the blade support of FIG. 19, FIG. 23 is an end elevational view of the blade support of FIG. 19, and FIG. 24 is a top plan view of the blade support of FIG. 19.

DESCRIPTION OF AN EXAMPLES EMBODYING THE BEST MODE OF THE INVENTION

Figure 1:
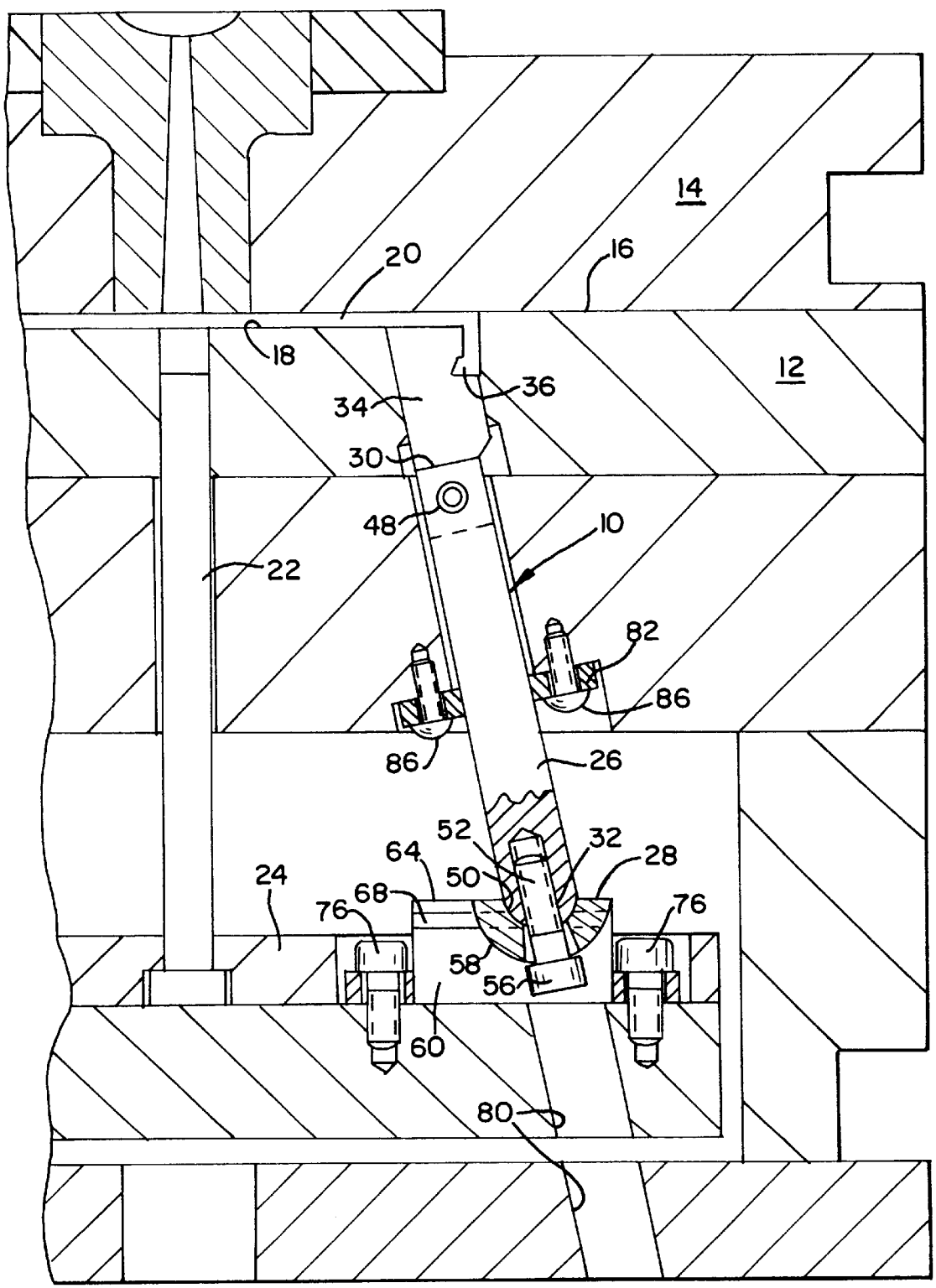
FIG. 1 is a partial elevational and cross-sectional view of a plastic injection mold, showing in elevation and in partial cross section a core lifter system according to the invention when installed in the mold.

A core lifter system to the invention is shown generally at 10 in FIG. 1. The core lifter system is intended to be installed in an appropriate mold, such as a plastic injection mold, and one form of a plastic injection mold is shown in FIG. 1. As is typical, the plastic injection mold comprises a lower core plate 12 and an upper cavity plate 14 which separate along a parting line 16. An appropriate cavity 18 is formed in the core and cavity plates for injection of a plastic part 20. As is typical, the mold may also include one or more ejector pins 22 which extend from a vertically movable ejector plate 24. All of the elements of the mold (with the exception of the core lifter system 10) are conventional, and are therefore not described in greater detail. Different parts can be used in the mold depending on the nature of the mold and the use of the core lifter system 10 according to the invention. The cavity 18 is injected with plastic for the plastic part 20 in a conventional fashion which also does not form any part of the invention.

The lifter system 10 includes a blade retainer 26 and a blade support 28. As illustrated in the drawing figures, the blade retainer 26 includes an upper blade-mounting end 30 at one end and a coupling end 32 at its opposite end.

The blade-mounting end 30 is shaped to engage a core blade 34. The core blade 34 may be of any configuration and size necessary to form an undercut 36, as desired, in the plastic part 20. The size and shape of the ejector blade 34 form no part of the invention, and therefore, as illustrated in FIGS. 5a through 8b, the ejector blade can be of practically unlimited size and configuration, a few of which have been depicted at 38, 40, 42 and 44. Whatever the configuration of the ejector blade, it includes a mounting portion 46 which is sandwiched between opposite portions of the blade-mounting end 30. The various ejector blades 34 and 38–44 are secured in place on the blade-mounting end 30 by means of a central pin 48 which passes through appropriate apertures in the blade-mounting end 30 and the mounting portion 46. coupling end 32 of the blade retainer 26 is seated in a semi-circular socket 50 formed in the blade support 28. The coupling end 32 is similarly-shaped so that the two parts may mate.

The blade retainer 26 is secured in the socket 50 of the support 28 by means of a screw 52. As illustrated in the drawing figures, the screw 52 extends through a hole 54 in the support 28 and is threadedly engaged in the coupling end 32. The hole 54 is radially elongated in the longitudinal dimension of the support 28, as best shown in FIGS. 12 and 14. The screw 52 has an expanded head 56, and the support 28 has a curvilinear bottom surface 58 against which the head 56 bears. Thus, by judicious adjustment of the blade retainer 26 in the blade support 28 before the screw 52 is installed, a particular angle of inclination of the blade retainer 26 in relation to the blade support 28 can be formed, limited by the dimensions of the hole 54. Once the screw 52 is fully installed, however, the angle of inclination of the blade retainer 26 in relation to the blade support 28 is fixed.

As illustrated in the drawing figures, for manufacturing purposes, it is preferred that the entire bottom surface 58 of the support 28 be curvilinear. It will be obvious however, that only those areas of the bottom surface adjacent to the hole 54 need be curvilinear, and other portions of the bottom surface can be formed as desired. Since the parts of the invention are preferably made from hardened metal, it is generally easier to machine the entire bottom surface 58 than a portion thereof.

The blade support 28 is installed for linear translation in a gib 60 affixed to the ejector plate 24. The gib 60, as best shown in FIGS. 15–18, is composed of opposite upstanding arms 63 and 64 having opposite respective grooves 66 and 68. When the blade support 28 is installed in the gib 60, corresponding opposite rails 70 and 72 are engaged in the grooves 66 and 68.

For installation in a plastic mold on the ejector plate 24, the gib 60 includes a pair of mounting holes 74, and appropriate screws 76 are used to secure the gib in place. Obviously, other means of attachment of the gib 60 to a plastic injection mold can be employed, as would be conventional. The mounting means forms no part of the invention.

As best illustrated in FIGS. 15 and 16, the gib 60 includes means permitting access to the screw 52, this being an oval aperture 78. As illustrated in FIG. 1, the mold can be provided with appropriate apertures 80 to permit access to the head 56 of the screw 52. Thus, even though the mold remains assembled, the screw 52 can be loosened and removed, permitting removal of the blade retainer 26 and its attached ejector blade. Unlike prior art devices, the entire mold need not be disassembled in order to gain access to the core lifter system 10 for removal of or changing of the ejector blades.

It is preferred that the blade retainer 26 be circular in cross section to easily fit within drilled apertures in the mold. For guiding purposes, a guide element in the form of a plate 82 can be installed in the mold, the plate 82 having a central aperture 84 which is shaped to accommodate passage of, and guide the blade retainer 26. The plate 82 can be secured in place by a pair of screws 86, or any appropriate means.

The invention is a significant improvement over prior core lifter systems. Not only does the invention allow a single blade retainer 26 to be used with a myriad of different ejector blades, such as the ejector blades 34 and 38–44, but also, because of the configuration and access through the bottom of the gib 60, the entire mold need not be disassembled in order to change the retainer 26 or ejector blade, or both.

Rather, by simply removing the screw 52, the ejector blade and blade retainer can be removed from the mold and replaced as needed.

During operation and opening of the mold along the parting lines 16, due to the geometry and angle of inclination of the core lifter system 10, the blade support 28 shifts laterally along the gib 60, with the rails 70 and 72 guided in the grooves 66 and 68. The angle of inclination of the blade retainer 26 to the blade support 28, however, always remains fixed.

FIGS. 19 through 24 illustrate an alternative form of the invention. With exception of the parts illustrated in FIG. 19, all other elements remain as explained above in relation to FIGS. 1 through 18, and are therefore not illustrated.

FIGS. 19 through 24 illustrate a modified blade retainer 88 and a blade support 90. Obviously, the blade retainer 88 would be used in place of the blade retainer 26, and the blade support 90 would be used in place of the blade support 28.

As illustrated, the blade retainer 88 has a semi-spherical bottom 92 which mates with a semi-spherical depression 94 in the blade support 90. The blade support 90 is otherwise functionally identical to the blade support 28 of the first form of the invention, and is fitted in the gib 60 in the same manner. An identical screw 52 is used for fixing the blade retainer 88 to the blade support 90. All other portions remain the same, and for the sake of indicating identity between the first form of the invention and that illustrated in FIGS. 19 through 24, functionally identical elements bear the same reference numeral, with a prime.

Various changes can be made to the invention without departing from the spirit thereof or scope of the following claims.

What is claimed is:

1. A core lifter system for a plastic mold, comprising
   a. a blade retainer having a blade-mounting end and an opposite coupling end,
   b. a support for said blade retainer, said support having a socket shaped to engage said coupling end, said coupling end being shaped to conform to said socket,
   c. means for permitting linear translation of said support on an ejector plate, and
   d. means for immobily securing said blade retainer in said socket with said blade retainer fixed at a desired angle of inclination relative to said support.

2. A core lifter system according to claim 1, in which said support is mounted in a gib, and said means for permitting linear translation comprises a guide in said gib engaging a guide in said support.

3. A core lifter system according to claim 2, in which said gib includes a central channel in which said support is mounted.

4. A core lifter system according to claim 3, in which said guide in said gib comprises opposite grooves in said gib and said guide in said support comprises opposite rails in said support, said rails engaging said grooves.

5. A core lifter system according to claim 2, including means in said gib permitting access to said securing means.

6. A core lifter system according to claim 5, in which said access means comprises an aperture in said rib.

7. A core lifter system according to claim 1, which said securing means comprises a screw extending through a hole in said support and threadedly engaged in said coupling end, said hole being radially elongated in a longitudinal dimension of said support.

8. A core lifter system according to claim 7, in which said screw includes an expanded head, and said support includes a curvilinear surface against which said head bears.

9. A core lifter system according to claim 1, in which said socket is semi-circular in cross section.

10. A core lifter system according to claim 1, including a removable ejector blade in said blade-mounting end.

11. A core lifter system according to claim 1, including a guide element mounted about said blade retainer.

12. A core lifter system according to claim 11, in which said guide element comprises a plate having a central aperture shaped to accommodate passage of said blade retainer.

13. A core lifter system for a plastic mold, comprising
   a. a blade retainer having a blade-mounting end and an opposite coupling end,
   b. a support for said blade retainer, said support having a socket shaped to engage said coupling end, said coupling end being shaped to conform to said socket,
   c. a gib, said support being mounted in said gib for linear translation with a guide in said gib engaging a guide in said support, and
   d. a screw extending through on a hole in said support and threadedly engaged in said coupling end for immobily securing said blade retainer in said socket with said blade retainer fixed at a desired angle of inclination relative to said support.

14. A core lifter system according to claim 13, in which said guide in said gib comprises opposite grooves in said gib and said guide in said support comprises opposite rails in said support, said rails engaging said grooves.

15. A core lifter system according to claim 13, including means in said gib permitting access to said securing means.

16. A core lifter system according to claim 15, in which said access means comprises an aperture in said gib.

17. A core lifter system according to claim 13, in which said screw includes an expanded head, and said support includes a curvilinear surface against which said head bears.

18. A core lifter system according to claim 13, in which said socket is semicircular in cross section.

19. A core lifter system according to claim 13, including a removable ejector blade engaged in said blade-mounting end.

* * * * *